J. H. T. & V. H. MILLS.
AUTOMATIC FEED WATER STEAM GENERATOR.
APPLICATION FILED JUNE 3, 1911.

1,052,080.

Patented Feb. 4, 1913.

Inventors
J. H. T. Mills
V. H. Mills

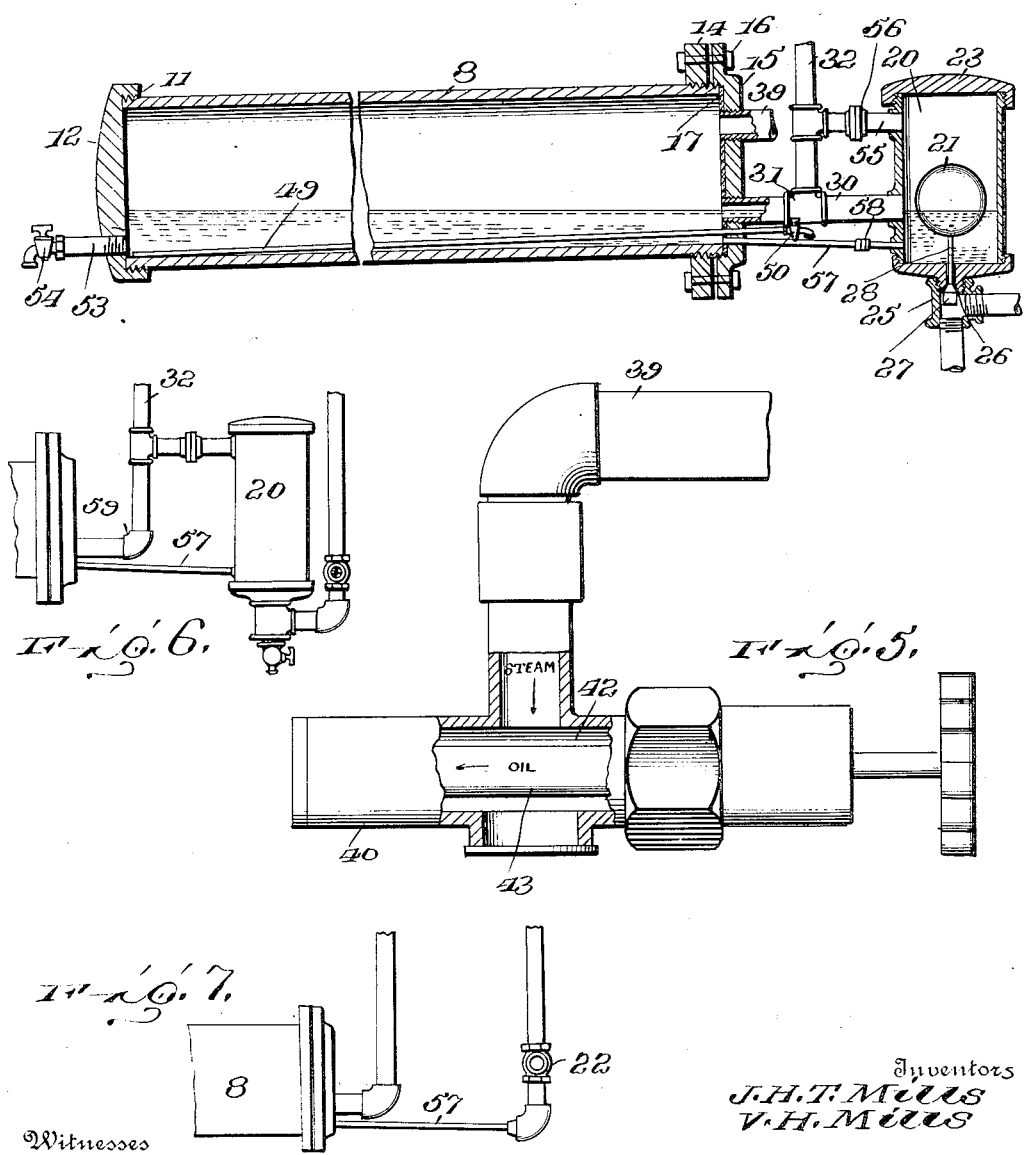

UNITED STATES PATENT OFFICE.

JOHN H. T. MILLS AND VIRGIL H. MILLS, OF HUBBARD, TEXAS.

AUTOMATIC FEED-WATER STEAM-GENERATOR.

1,052,080. Specification of Letters Patent. Patented Feb. 4, 1913.

Application filed June 3, 1911. Serial No. 631,167.

*To all whom it may concern:*

Be it known that we, JOHN H. T. MILLS and VIRGIL H. MILLS, citizens of the United States, residing at Hubbard, in the county of Hill and State of Texas, have invented certain new and useful Improvements in Automatic Feed-Water Steam-Generators, of which the following is a specification.

This invention relates to steam generators for hydrocarbon burners and has for its object the provision of a generator of simple and durable construction adapted to be placed either inside the ash pit of a boiler furnace or on the outside thereof so that the surplus heat from said generator may be utilized to assist in heating the boiler, while the steam therein is being raised to a pressure sufficient for delivery to the main burner.

A further object of the invention is to provide a generator having main and auxiliary burners connected therewith, one of which is utilized for heating said generator and the other for heating the boiler, after the generator has been shut down.

A further object is to provide a generator having a low gravity water supply, means being provided for preventing back pressure of steam from checking the flow of water into said generator.

A further object is to provide means for automatically maintaining a constant water level in the generator regardless of the variations in the steam pressure or the escape of steam from said generator.

A further object is to provide means for draining the water from the generator when the latter is not in use.

A further object is to provide means for refilling the water tank from the boiler or other extraneous source of supply without the necessity of shutting down or otherwise interfering with the auxiliary burner during the filling operation.

A further object is to provide a generator having a float valve connected in the fluid conductor between the water supply tank and generator, means being provided for controlling the supply of water to said float valve.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
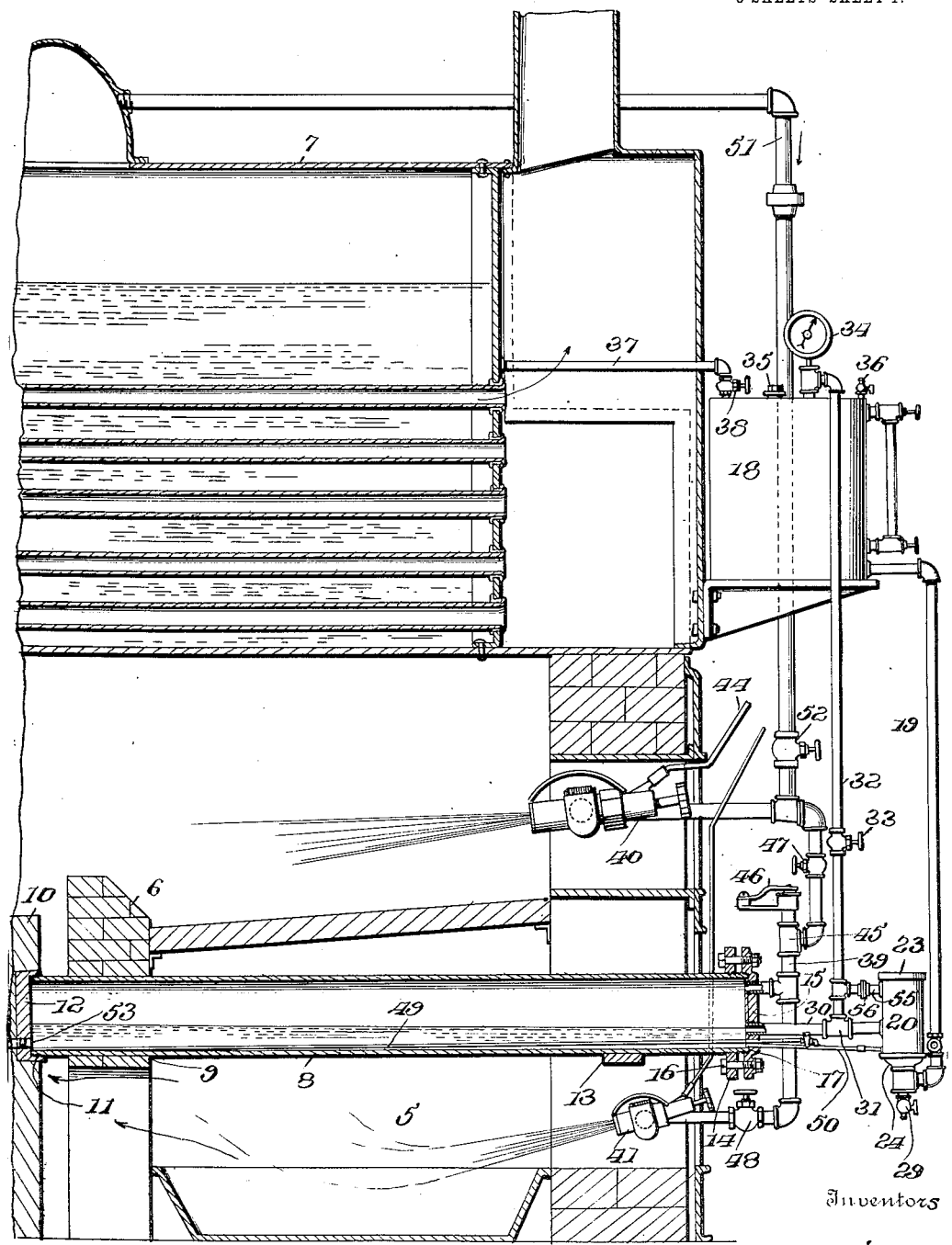
Figure 2:
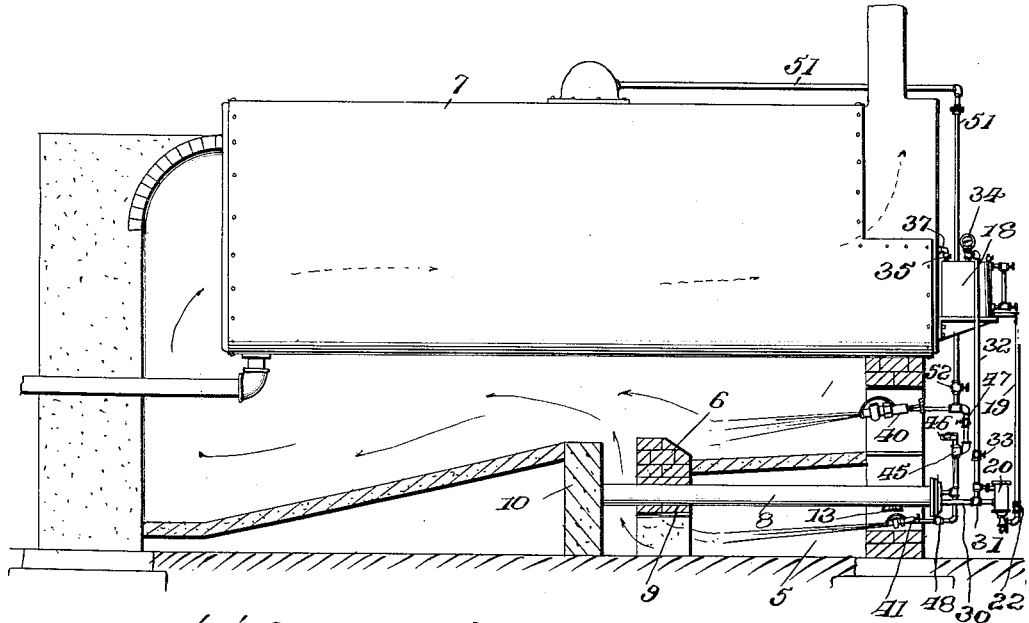
Figure 3:
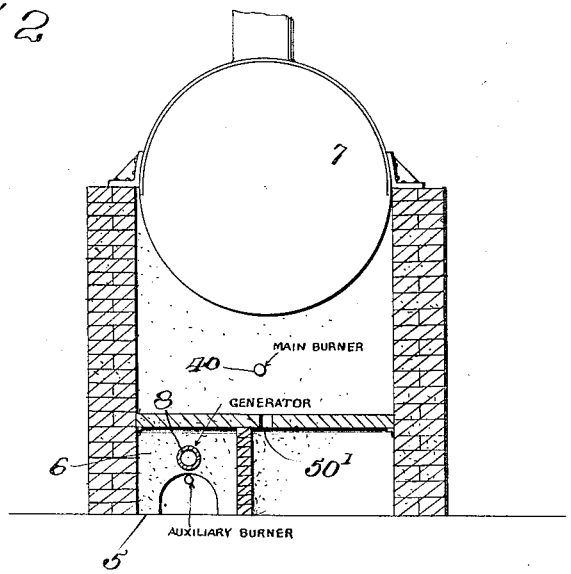

For a full understanding of the invention and the merits thereof, reference is to be had to the following description and accompanying drawings, in which:

Figure 1 is a vertical sectional view of a boiler furnace provided with a steam generator constructed in accordance with our invention; Fig. 2 is a longitudinal sectional view, partly in elevation, showing the path of the products of combustion from the auxiliary burner during the initial heating of the generator; Fig. 3 is a transverse sectional view of Fig. 2, the boiler being shown in elevation; Fig. 4 is an enlarged longitudinal sectional view of the generator and float tank, the generator being foreshortened in order to clearly show the construction thereof; Fig. 5 is a longitudinal sectional view, showing the construction of one of the burners; Fig. 6 is a side elevation, showing another form of the invention; Fig. 7 is a similar view, showing the float valve and casing omitted and the water conductor from the generator connected directly with the water pipe from the supply tank.

Corresponding and like parts are referred to in the following description and indicated in all the views of the drawings by the same reference characters.

The improved steam generator forming the subject matter of the present invention is principally designed for use in connection with boiler furnaces and by way of illustration is shown applied to a boiler furnace in which 5 designates the ash pit, 6 the bridge wall and 7 the boiler. The generator comprises a tubular body portion 8, preferably arranged in the ash pit 5 so that the heat from the generator may be utilized to assist in heating the water in the boiler 7, although said generator may be supported on the outside of the furnace, if desired. The rear end of the generator 8 is preferably inclined downwardly and passes through an opening 9 in the bridge wall for engagement with a supporting base or pillar 10, the rear end of the body portion 8 being threaded at 11 to receive a correspondingly threaded cap or closure 12. The cap 12 is preferably housed within the pillar or base 10 to assist in protecting the cap and preventing the intense heat from coming in contact therewith when the device is in operation. The forward end of the body portion 8 is supported on a transverse bar 13 and is exteriorly threaded for engagement with a flange or collar 14, which latter serves to support a removable head or front plate 15. The head or front plate 15 is extended laterally beyond the exterior walls of the body portion and is provided with spaced perforations for the reception of bolts or similar fastening devices 16, which bolts also pierce corresponding perforations formed in the flange 14, there being a washer or gasket 17 interposed between the head 15 and body portion 8 in order to form an air and steam tight joint between the parts.

Arranged on the outside of the furnace, is a water supply tank 18 having a depending conductor 19, the lower end of which is connected with a casing 20 in which is mounted a float valve 21, there being a valve 22 connected in the conductor 19 near the base of the casing 20 for controlling the flow of water from the tank to said casing. The casing 20 is provided with upper and lower threaded caps 23 and 24, the lower one of which is provided with a depending nipple 25 having a valve seat 26 which co-acts with a valve 27 mounted on a rod 28 depending from the float 21 so that as the float rises and falls, the flow of water to the casing 20 will be automatically regulated or controlled independently of the valve 22. The nipple 25 is preferably provided with a depending drain cock 29 to permit the water in the casing 20 to be discharged when it is desired to remove the nipple 25 to effect any necessary repairs to the valve.

Communicating with the casing 20, is one end of a water supply pipe 30, the opposite end of which is threaded in an opening in the front piece or head 15 so as to permit the water from the casing 20 to enter the body portion 8 when generating steam. The pipe or conductor 30 is provided with a T-nipple 31, to which is connected one end of a steam pipe 32, the other end of which communicates with the tank 18 at the top thereof so that a portion of the steam in the generator may enter the tank and the pressure of said steam utilized for the purpose of feeding the water from said tank to the float casing 20. The steam pipe 32 is provided with a shut-off valve 33 and a steam gage 34, which latter is preferably arranged above the water tank, as shown. The water tank 18 is also preferably provided with a filling plug or valve 35 and an air cock 36 to permit the escape of air from said tank when replenishing the water in the latter. The tank 18 may be filled with water by removing the plug 35 and pouring the water into the tank through the filling opening, or the tank may be filled directly from the boiler 7 through the medium of a pipe or conductor 37 in which is arranged a valve 38 for cutting off the supply of water from the boiler to the tank.

Communicating with the interior of the body portion 8, above the water supply pipe 30, is a steam conductor 39, to the opposite ends of which are secured main and auxiliary burners 40 and 41, the auxiliary burner 41 being adapted to heat the body portion 8 and generate steam therein for delivery to the main burner 40 until the boiler is heated by the main burner 40 to produce steam at sufficient pressure for delivery to said main burner. The burners 40 and 41 are of any suitable construction, each burner being provided with a steam passage 42 and an oil passage 43, to which latter is connected a pipe 44 leading to a source of fuel supply. A T-coupling 45 is connected with the steam supply 39 and is provided with a safety valve 46 so as to permit the escape of excess steam from the body portion 8. Suitable valves 47 and 48 are also connected in the steam conductor 39, one of which, namely, the valve 47 is for the purpose of cutting off the supply of steam from the generator to the main burner 40, and the other valve 48, for the purpose of cutting off the supply of steam from the generator to the auxiliary burner 41.

Arranged within the body portion 8, is a relatively small pipe 49, one end of which is arranged near the cap 12, while the other end thereof extends through an opening in the front head or plate 15 and is threaded for engagement with a correspondingly threaded faucet or valve 50 so that by opening the valve 50, the water of condensation within the body portion 8 may be readily withdrawn from the generator when the latter is under pressure.

It will here be noted that as the rear end of the body portion 8 is inclined downwardly, the water of condensation will have a tendency to accumulate near the cap 12 so that practically all of the water may be withdrawn from the generator when desired, by merely opening the valve 50. It will also be noted that the water level in the body portion or generator 8, is on a line with the water level in the float casing 20 so that any variation in the water level in the generator will cause the float to immediately respond, thereby to regulate the flow of water from the casing to the generator and automatically maintain the water in the generator at a constant level. It will further be noted that the water level in the body portion 8 and float casing 20 is such that only the lower portion of the supply pipe 30 is covered with water, thus to permit the steam from the body portion or generator 8 to flow through the pipe 30 above the water level therein and thence through the pipe 32 to the water tank, the steam pressure in the water tank, float casing and generator, being equal so as to prevent back pressure from checking the flow of water to said generator.

That portion of the ash pit, above the generator or body portion 8 and between the bridge wall 6 and front of the furnace, is preferably covered with brick, mortar or the like so as to render the ash pit, at the generator, substantially air tight and thus cause the flame and heat from the auxiliary burner 41 to pass rearwardly and upwardly beneath the body portion 8 and through the flues of the boiler 7, as indicated by the arrows in Fig. 2 of the drawings, thereby not only to heat the body portion or generator 8, but also to assist in heating the water in the boiler 7 before the main burner 40 is lighted, as before stated.

The grate bars on that side of the furnace opposite the body portion or generator 8, are also preferably covered with brick or mortar, there being a suitable opening 50' formed in this inclosing layer to permit the passage of air from the ash pit to the main burner 40 to assist in promoting combustion. In order to supply steam to the main burner 40, after the generator 8 is shut down and the burner 41 is not in use, there is provided a conductor 51, one end of which communicates with the steam dome of the boiler, while the other end thereof communicates with the main burner 40, there being a valve 52 arranged in said conductor for cutting off the flow of steam to the main burner when the auxiliary burner is operated to effect the heating of the body portion or generator 8.

Threaded in an opening in the cap or closure 12 of the generator, is a drain or outlet pipe 53, one end of which communicates with the interior of the generator near the bottom thereof, while the other end of said pipe is provided with a valve 54 to permit draining of the generator should the operator fail to empty the latter, by opening the valve 50 when the generator is under pressure. The opening in the closure 12 for the drain pipe 53, is preferably large enough to permit the insertion of a suitable scraping tool through said pipe receiving opening when the drain pipe 53 is removed, thereby to facilitate cleaning the interior of said generator when necessary.

A branch pipe 55 preferably connects the conductor 32 and casing 20 so as to admit steam above the float, said branch pipe being provided with a union 56, as shown. In order to admit water from the float casing 20 to the generator, before the water in said casing rises to the level of the conductor 30, there is provided a small pipe 57 having one end thereof connected to the casing by a union 58 and its other end opening into the generator 8 at the bottom thereof, as shown.

In operation, the supply tank 18 being full of water, the valves 22, 38, 47, 48 and 52 are closed, and also the air valve 36 and drain cocks 29 and 50, after which a fire is made in the ash pit beneath the generator or a suitable torch placed therein to initially heat said generator and the valves 22, 33 and 48 moved to partially open position so as to admit water gradually to the interior of the generator and to allow a portion of the steam generated in the body portion 8 to flow through the conductor 32 to the water tank and another portion thereof to flow through the conductor 39 to the auxiliary burner 41, thereby to feed the water to the burner and also to atomize the oil at the burner 41. The valve 47 is then opened to admit steam from the body portion 8 to the main burner 40 and said burner lighted in the usual manner to effect the heating of the water in the boiler 7. After the water in the boiler has been heated to generate steam at sufficient pressure to be fed to the main burner 40, the valves 47 and 22 are closed and the valve 52 moved to open position, thus allowing the steam in the boiler 7 to flow through the conductor 51 to the main burner, as will be readily understood. If the water in the supply tank 18 is all consumed before sufficient steam is raised in the boiler to operate the main burner 40, the valves 33 and 22 are closed and the air valve 36 moved to open position to permit the pressure in the water tank to escape, the valve 38 being then opened so as to allow the water from the boiler to be fed through the conductor 37 to the water tank.

It will here be noted that when the body portion or generator 8 is shut down and the valve 50 moved to open position, the steam pressure in the generator will forcibly eject the water of condensation in said generator through the pipe 49 and valve 50 so as to permit the same to be readily discharged. It will also be noted that the generator cannot run dry and burn or overheat the body portion 8, while there is water in the supply tank 18, neither can the generator fill up with water and put out the burners, the arrangement of the several valves being such that any desired pressure can be obtained with a low water gravity feed.

In Fig. 6 of the drawings, there is illustrated another form of the invention, in which the pipe 30 is dispensed with and the lower end of the conductor 32 connected by an L-coupling 59 directly with the adjacent end of the generator so as to allow the steam to enter the casing 20 above the float valve only, and the water to enter the generator by a single conductor, namely, the pipe 57. The conductor 30 and pipe 57 may be used together to feed water to the generator, but either may be dispensed with and used independently, if desired. Another form of the invention is shown in Fig. 7 of the drawings, in which the casing 20 and float valve are omitted from the system, the pipe 57 being connected directly with the lower end of the water supply pipe 19 and the flow of water to the generator controlled by operating the valve 22.

It will of course be undertsood that any number of generators may be used in connection with each boiler furnace, and that said generators may be placed in any other convenient position than in the ash pit, of desired. It will also be understood that the generator may be used in connection with furnaces burning either wood or coal as fuel or in brick kilns and the like, without departing from the spirit of the invention.

Having thus described the invention, what is claimed as new is:

1. In a device of the class described, a steam generator, main and auxiliary burners operatively connected with the generator and arranged respectively above and below the same, means for conducting steam from the generator to each burner, and means for supplying steam from an extraneous source to one of the burners when the other burner is not in use.

2. In a device of the class described, a steam generator, a burner operatively connected with the steam space of said generator, a water supply tank, and means operatively connected with the supply tank and generator for maintaining a constant water level in said generator.

3. In a device of the class described, a steam generator, main and auxiliary burners operatively connected with the generator and arranged respectively above and below the same, a water supply tank, a water conductor communicating with the interior of the generator, and means connected in the water conductor for maintaining a constant water level in the generator.

4. In a device of the class described, a steam generator, main and auxiliary burners operatively connected with the generator and arranged respectively above and below the same, a water supply tank, a conductor forming a source of communication between the water supply tank and the interior of the generator, a casing connected in said conductor, and a float valve operating within the casing for automatically controlling the flow of water through the conductor to the generator.

5. In a device of the class described, a downwardly inclined steam generator, a burner operatively connected with said generator, a water supply tank having a low gravity feed, a conductor forming a connection between the water supply tank and interior of the generator, a horizontally disposed pipe arranged within the generator near the bottom thereof and having its rear end disposed at the lower end of the generator and its forward end extending through the high end of said generator, and a valve connected in the pipe to permit the discharge of water of condensation from the generator when the valve is moved to open position.

6. In a device of the class described, a steam generator, a water supply tank, a fluid conductor forming a connection between the water supply tank and interior of the generator, a valve connected in the fluid conductor for automatically controlling the flow of water to the interior of the generator, and a pipe having one end thereof connected with the fluid conductor and the other end thereof communicating with the water tank for admitting steam from the generator to said water tank.

7. In a device of the class described, a steam generator, a water supply tank, a fluid conductor forming a connection between the water supply tank and the interior of the generator, a casing connected with the water supply tank, a float operating within the casing and provided with a valve for controlling the flow of water from the tank to the interior of said generator, main and auxiliary burners, a pipe connecting said burners with the interior of the generator for conducting a portion of the steam from said generator to the burners, and means for conducting another portion of the steam from the generator to the water supply tank and float valve casing.

8. In a device of the class described, a steam generator, a water supply tank, a fluid conductor forming a source of communication between the water supply tank and the interior of the generator, main and auxiliary burners operatively connected with the interior of said generator, a float valve connected in the fluid conductor for automatically maintaining a constant level of water in the generator, means for conducting a portion of the steam from the generator to the water supply tank, and means for replenishing the water in the tank without shutting down either burner.

9. In a device of the class described, a steam generator, main and auxiliary burners operatively connected with the generator and arranged respectively above and below the same, means for conducting steam from the generator to each burner, a water supply tank, a conductor leading from the water supply tank to the interior of the generator, a valve for controlling the flow of water from the tank to the interior of the generator, means for supplying steam from said generator to one of the burners when the other burner is not in use, and means for refilling the water supply tank without interfering with either burner.

10. In a device of the class described, a steam generator, a water supply tank, a fluid conductor forming a connection between the water supply tank and interior of the generator, main and auxiliary burners arranged respectively above and below the generator, a steam conductor forming a connection between the interior of the generator and said burners and provided with a safety valve, and means connected in the fluid conductor for automatically maintaining a constant water level in the generator.

11. In a device of the class described, a steam generator, a water supply tank, a conductor forming a connection between the supply tank and the interior of the generator, a casing connected in said conductor, a float valve operating in the casing for controlling the flow of water through the conductor to the generator, a valve for controlling the flow of water from the tank to the float casing, a steam pipe connected with said conductor and leading to the upper portion of the water tank, a valve arranged in said steam pipe, main and auxiliary burners, a steam conductor forming a source of communication between the interior of the steam generator and both burners, and valves for controlling the admission of steam to said burners.

12. In a device of the class described, a steam generator including a hollow body portion having one end thereof provided with a removable cap and its other end formed with a detachable front plate, a water supply tank, a fluid conductor extending through the front plate of the generator and connected with the water supply tank near the bottom thereof, a casing connected in said fluid conductor, a float operating within the casing and provided with a valve for controlling the flow of water through the conductor to the interior of the generator, a steam pipe connected with the conductor and leading to the top of the water supply tank, main and auxiliary burners, and a steam pipe forming a connection between the generator and each burner.

13. The combination with a boiler furnace, of a generator arranged within the furnace beneath the boiler thereof, a water supply tank, a conductor forming a connection between the supply tank and interior of the generator, means connected in the conductor for automatically maintaining a constant water level in the generator, main and auxiliary burners operatively connected with said generator, one of which is disposed below the boiler and the other below the generator, and means for conducting water from the boiler to the supply tank.

14. The combination with a boiler furnace, of a generator arranged within the furnace beneath the boiler, a water supply tank, a conductor forming a connection between the water supply tank and interior of the generator, a float valve arranged in the conductor for controlling the flow of water to the interior of the generator, main and auxiliary burners, one of which is disposed beneath the boiler and the other beneath the generator, a steam pipe forming a connection between the interior of said generator and each burner, and means for supplying steam from the boiler to the main burner independently of the generator.

15. The combination with a boiler furnace, of a generator arranged within the furnace beneath the boiler, a water supply tank, a conductor forming a connection between the water supply tank and interior of said generator, a valve connected in the conductor for controlling the flow of water to the interior of the generator, main and auxiliary burners, one of which is disposed beneath the boiler and the other beneath the generator, a steam pipe forming a connection between the interior of said generator and each burner, means for supplying steam to the main burner independently of the generator, means for conducting water from the boiler to the supply tank, and means for supplying steam from said generator to the supply tank.

16. The combination with a boiler furnace including an ash pit and pillar block, of a generator having a tubular body portion arranged within the ash pit and resting on the pillar block, a water supply tank, a conductor forming a connection between the water supply tank and interior of the generator, a float valve connected in said conductor for automatically maintaining a constant water level in said generator, main and auxiliary burners, one of which is disposed beneath the boiler and the other in the ash pit beneath the generator, a steam pipe forming a connection between the interior of the generator and each burner, means for conducting a portion of the steam from said generator to the water supply tank and float casing, means for conducting steam from the boiler to the main burner independently of the generator, a conductor forming a connection between the water supply tank and boiler for feeding water from the latter to said tank, and an air valve connected with the tank.

17. The combination with a boiler furnace including a bridge wall and pillar, of a downwardly inclined generator extending through the bridge wall and seated in said pillar, a cap forming a closure for the inner end of the generator, that portion of the furnace between the bridge wall and front of the furnace and directly above said generator being closed to form a substantially air tight chamber, a water supply tank, a conductor for supplying water from the tank to the interior of the generator, a valve connected in the conductor for controlling the supply of water from the tank to said generator, a main burner operatively connected with the interior of the steam generator for heating the boiler, and an auxiliary burner also operatively connected with the interior of the generator for heating the bottom of the latter.

18. The combination with a boiler furnace, of a steam generator disposed within the ash pit of the furnace, main and auxiliary burners operatively connected with the generator, one of which is disposed below the boiler and the other below the steam generator, a water supply tank operatively connected with the interior of said generator, means connected in the conductor for maintaining a constant water level in the generator, and means for conducting steam from the boiler to the main burner when the auxiliary burner is not in use.

19. In a device of the class described, a steam generator, a water supply tank, a fluid conductor forming a connection between the water supply tank and interior of the generator, a valve casing, a float valve arranged within the casing, a pipe forming a connection between the fluid conductor and valve casing above the float, a water conductor forming a connection between the supply tank and lower portion of the valve casing, and an auxiliary pipe forming a direct connection between the lower end of said valve casing and the interior of the generator.

20. In a device of the class described, a steam generator, main and auxiliary burners operatively connected with the generator, a water supply tank, a casing, a float operating within the casing, a fluid conductor having its upper end connected with the supply tank and its lower end connected with the interior of the float casing and generator, respectively, a water supply pipe forming a connection between the tank and casing, and an auxiliary pipe connecting the lower end of the generator with the lower end of the casing.

21. In a device of the class described, a steam generator, main and auxiliary burners operatively connected with the generator, a water supply tank, a supply pipe connected with the tank, an auxiliary pipe having one end thereof communicating with the interior of said generator and its other end connected with the water supply pipe, and a valve arranged within the supply pipe for controlling the flow of water to the generator.

22. In a device of the class described, a steam generator, a drain pipe communicating with the rear end of said generator and provided with a stop cock, main and auxiliary burners operatively connected with the generator, a water supply tank, a pipe connected with the water supply tank, an auxiliary pipe forming a connection between the front end of the generator and the supply pipe, and a valve connected in said supply pipe.

23. In a device of the class described, a steam generator, a drain pipe extending from the rear end of the generator and provided with a stop cock, a second drain pipe projecting from the front end of said generator and provided with a similar drain cock, a burner operatively connected with the generator, a water supply tank, a conductor connected with the water supply tank, an auxiliary pipe operatively connected with the conductor, and means for controlling the flow of water through the auxiliary pipe to the generator.

In testimony whereof, we affix our signatures in presence of two witnesses.

JOHN H. T. MILLS. [L. S.]
VIRGIL H. MILLS. [L. S.]

Witnesses:
J. T. HENDERSON,
M. A. J. CARLISLE.